United States Patent [19]

Kestly et al.

[11] Patent Number: 5,277,434
[45] Date of Patent: Jan. 11, 1994

[54] MULTIPLE LAYER CYLINDER HEAD GASKET

[75] Inventors: Michael J. Kestly, Bolingbrook; Thomas P. Plunkett, Lemont, both of Ill.

[73] Assignee: Dana Corporation, Toledo, Ohio

[21] Appl. No.: 943,667

[22] Filed: Sep. 11, 1992

[51] Int. Cl.$^5$ .................................... F16J 15/12
[52] U.S. Cl. ..................... 277/235 B; 277/235 A; 277/236
[58] Field of Search ............... 277/235 B, 236, 235 A

[56] References Cited

U.S. PATENT DOCUMENTS

| | | | |
|---|---|---|---|
| 4,325,559 | 4/1982 | Czernik et al. | 277/235 B |
| 4,351,534 | 9/1982 | McDowell | 277/235 B |
| 4,535,999 | 8/1985 | Locacius | 277/235 B |
| 4,635,948 | 1/1987 | Zerfass et al. | 277/235 B |
| 4,834,399 | 5/1989 | Udagawa et al. | 277/234 |
| 4,849,295 | 7/1989 | Dickerman et al. | 428/457 |
| 4,898,396 | 2/1990 | Udagawa | 277/235 B |
| 4,968,045 | 11/1990 | Abe et al. | 277/235 A X |
| 5,062,649 | 11/1991 | Udagawa | 277/235 B |
| 5,087,058 | 2/1992 | Miura et al. | 277/235 B |
| 5,161,809 | 11/1992 | Matsushita et al. | 277/235 B |
| 5,508,908 | 10/1991 | Udagawa | 277/235 B |

FOREIGN PATENT DOCUMENTS

| | | | |
|---|---|---|---|
| 0121258 | 7/1984 | Japan | 277/235 B |
| 0261960 | 12/1985 | Japan | 277/235 B |
| 0100249 | 5/1988 | Japan | 277/235 B |
| 0186950 | 8/1988 | Japan | 277/235 B |
| 69461 | 3/1992 | Japan | 277/235 B |

Primary Examiner—William A. Cuchlinski, Jr.
Assistant Examiner—James K. Folker
Attorney, Agent, or Firm—Dykema Gossett

[57] ABSTRACT

A dual coating system is utilized for a cylinder head gasket of an internal combustion engine. A lubricous, high temperature coating is located at the combustion seals while an elastomeric coating is located at fluid flow openings. The coatings are applied to entire sides of plates in such a manner that the coatings do not have to be selectively applied to, or masked off from any one particular layer. The thickness of the various gasket components can be adjusted by shims to obtain an optimum load balance between seals.

12 Claims, 1 Drawing Sheet

MULTIPLE LAYER CYLINDER HEAD GASKET

BACKGROUND OF THE INVENTION

The present invention relates to improvements in multi-layer gaskets.

Gaskets are often used as a seal between mating mechanical components. One common application involves gasket placement between the engine block and cylinder head of an internal combustion engine. Cylinder head gaskets typically extend around the cylinder bores to provide a combustion seal, maintaining the high temperature gases of combustion within the cylinder bores. At the same time, the gaskets also seal fluid flow openings such as coolant and oil openings to prevent undesirable mixing. In addition, such gaskets prevent leakage by sealing the areas around the bolts which connect the cylinder head and engine block. The gasket bears the load from a bolted connection of the mechanical components and relies upon that load to provide a seal.

To function reliably in the environment of an internal combustion engine, the gaskets must be resistant to wear resulting from fretting corrosion, heat, and mechanical stress, particularly around cylinder bores. Thus, it is desirable to have a lubricous high temperature coating, which is "slippery" with a low coefficient of friction, protecting those portions of a gasket surrounding each cylinder bore. Simultaneously, however, a gasket must ensure an effective fluid seal around fluid flow openings. Thus, it is also desirable to have an elastomeric coating applied to those portions of the gasket surrounding fluid flow openings. It has been difficult to achieve these goals in a single gasket, particularly since it is preferable that the elastomeric coating be spaced away from those portions of the gasket surrounding cylinder bores.

Multi-layer metal gaskets have been developed which have the above-described coatings applied as indicated. Such gaskets have been difficult and expensive to produce. Typically, the layers of such gaskets have been blanked and configured with coatings selectively applied to or masked off from the rest of a side of a particular layer. Difficulties in masking and selectively applying protective coatings to layers have limited the effectiveness of such gaskets.

It is also known to utilize separate plates carrying the high temperature and elastomeric coatings, with the elastomeric coated plates being spaced away from the cylinder bores. The varying thickness of various portions of such a gasket has created undesirable load balances between the various seals, causing problems such as insufficient sealing stress which may result in gasket failure.

In short, mechanical limitations and cost has restricted the ability to provide multi-layer gaskets with varying characteristics depending upon the nature of the seal required to be effected at a particular location.

SUMMARY OF THE INVENTION

A disclosed multi-layer gasket for an internal combustion engine includes a plurality of metal plates which form layers of the gasket. A lubricous, high temperature coating such as polytetrafluoroethylene ("PTFE"), sold under the registered trademark Teflon ®, or molybdenum disulfide is disposed on a first plate located at a combustion seal. An elastomeric coating is disposed on a second plate around the fluid flow areas. This coating conforms to the mating surfaces of the cylinder head and engine block to insure an effective fluid seal. The elastomeric coated plate is shaped such that the coating is not exposed to the high temperatures of the combustion gases.

The separate plates are configured in such a manner that the coatings do not have to be selectively applied or masked from any one particular plate. Instead, the coatings may be applied to an entire side of a plate. This represents a large cost savings in production over prior art methods. A shim is also positioned at least around the cylinder bores in order to compensate for the fact that the elastomeric coated layer(s) do not extend to this point and to obtain an optimum load balance between the combustion seals and the fluid seals. This eliminates the problems of insufficient sealing or gasket damage that may have resulted from the prior art multi-layer gaskets.

The objects of the present invention can be best understood from the following specification and drawings of which the following is a brief description.

DESCRIPTION OF A DETAILED EMBODIMENT

Figure 1:
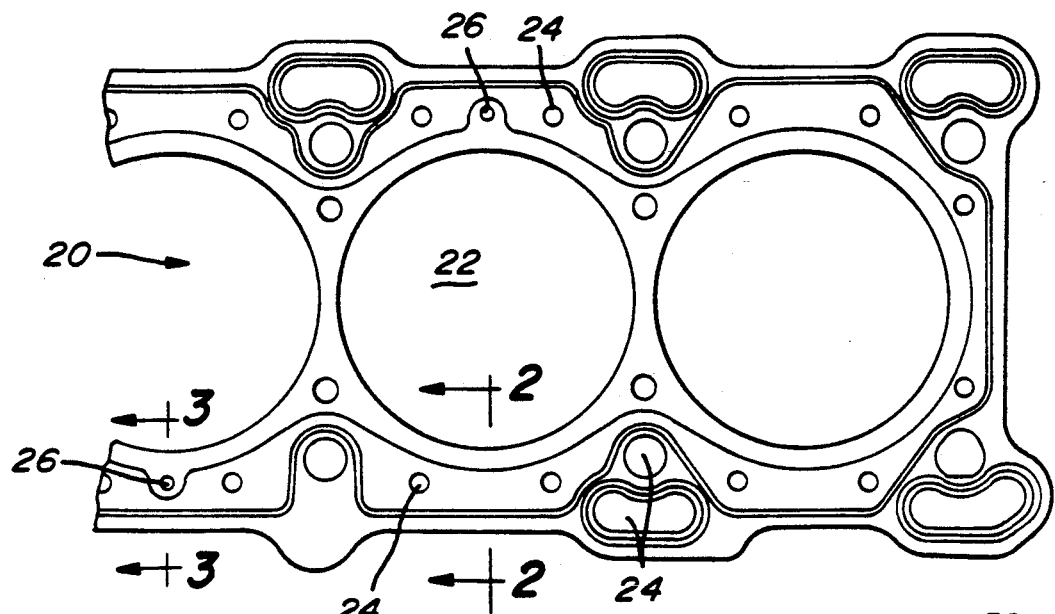
FIG. 1 is a planar view of a portion of a gasket incorporating the present invention.

A cylinder head gasket illustrated in FIG. 1 includes cylinder bores 22, fluid flow openings 24, and rivets 26. Gasket 20 provides a combustion seal around cylinder bores 22 and provides a fluid flow seal around fluid flow openings 24.

Figure 2:
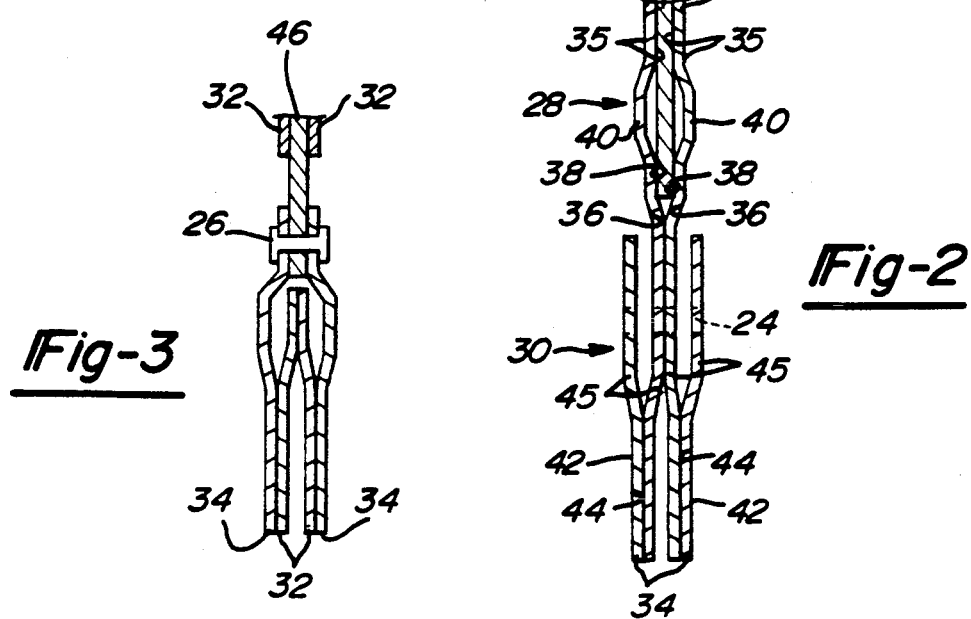
FIG. 2 is a cross-sectional view of an embodiment of the present invention taken along line 2—2 of FIG. 1.

FIG. 2 illustrates an embodiment of gasket 20, including a combustion seal 28 and a fluid seal 30. Gasket 20 includes two base plates 32 and two outer plates 34.

Base plates 32 extend through the entire gasket and may include a lubricous, high temperature coating 35 on sides 36 and 38. Although coating 35 is disclosed on both sides 36 and 38, coating on only one side may produce acceptable results. Coating 35 may be applied to the entire surface of sides 36 and 38. Preferably, a coating such as polytetrafluoroethylene ("PTFE"), sold under the registered trademark Teflon ®, or molybdenum disulfide is used to reduce friction, fretting corrosion, and improve gas sealability. This coating, which is highly desirable at the combustion seal 28, is not as useful at fluid flow openings 24, however. Full mechanical beads 40 are formed in base plates 32 adjacent to cylinder bore 22 and include coating 35. When gasket 20 is tightened by the action of bolting the mechanical components together, load is first applied to bead 40 which increases the pressure of gasket 20 upon the mating engine components while improving conformability and recovery of combustion seal 28.

Each of outer plates 34 are positioned adjacent to an exterior side 36 of a base plate 32. Outer plates 34 are located around the fluid flow openings 24 and include an elastomeric coating 42 on at least an exterior side 44 which comes into facial contact with either the cylinder head or engine block when the gasket is tightened.

Coating 42 may be applied to the entire surface of exterior side 44. Elastomeric coating 42 helps to ensure an effective fluid seal.

To provide fluid seal 30, mechanical beads 45 are formed in both base plates 32 and outer plates 34 adjacent a fluid flow opening 24 and include coating 42. Since less pressure or stress is generally needed, however, between gasket 20 and the mating engine components for fluid seal 30, partial beads are illustrated. Full beads such as bead 40 may also be used.

A shim 46 is positioned circumferentially around each cylinder bore 22. The thickness of the shim is adjusted to obtain an optimum load balance between the combustion seal and the fluid seal in conjunction with the stiffness of the engine environment. The stack-up or overall thickness of combustion seal 28 may be greater than the stack-up thickness of fluid seal 30. Shim 46 reduces such problems as insufficient sealing stress and possible gasket failure which might otherwise result from using a multi-layer gasket with varying thickness of its portions.

Plates 32 and 34 are preferably made from either 301 or 304 stainless steel with a temper range of ½ hard to Full Hard. Under some circumstances it may be desirable to make base plates 32 from a low carbon steel to minimize fatigue cracking while maintaining initial conformance. The thickness of plates 32 and 34 is preferably 0.25 mm (0.010 in.). Typically, the coating of PTFE is between 0.010 to 0.020 mm (0.0004 and 0.0008 in.) while the rubber coating is Nitrile Butadiene Rubber and is approximately 0.025 mm (0.001 in.) thick. Preferably, shim 46 is formed from low carbon steel or stainless steel and may include Zinc Dichromate. In one embodiment, the preferred thickness of shim 46 is 0.6 mm (0.024 in.).

Figure 3:
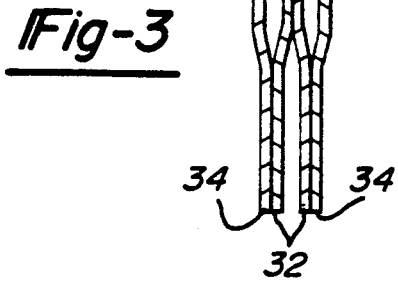
FIG. 3 is a cross-sectional view of an embodiment of the present invention taken along line 3—3 of FIG. 1.

FIG. 3 illustrates one method of securing gasket elements, although any number of means known in the art may be used. In this cross-section, rivet 26 secures plates 32 in a proper orientation with shim 46. Plate 34 is blanked in the area adjacent to rivet 26. Other known fasteners may be used to secure plates 32 to other gasket elements.

Figure 4:
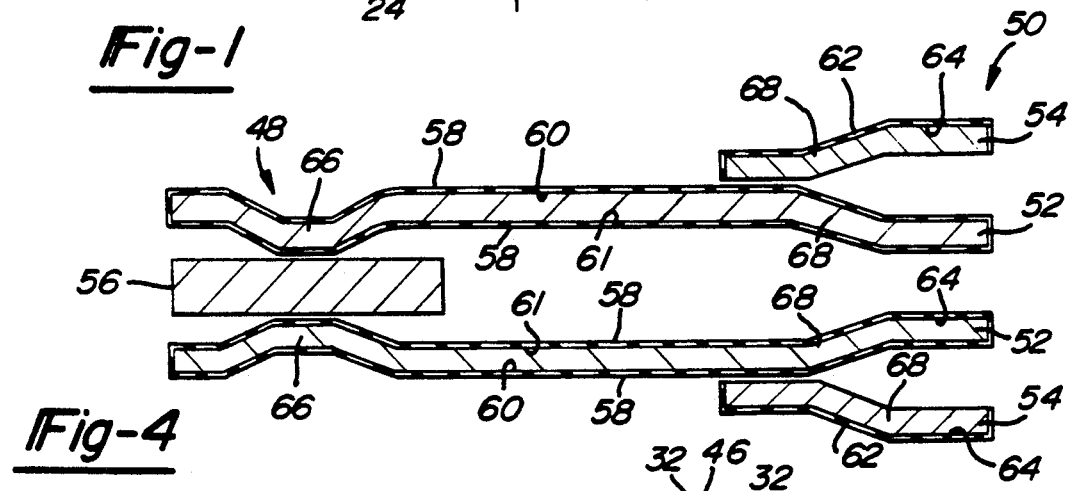
FIG. 4 is a cross-sectional view of an alternative embodiment of the present invention.

FIG. 4 illustrates an alternative embodiment of the present invention including a combustion seal 48, fluid seal 50, base plates 52, outer plates 54, and shim 56. A lubricous, high temperature coating 58 may be used on both sides 60 and 61 of base plates 52 while an elastomeric coating 62 may be used on at least an exterior side 64 of outer plates 54. Full beads 66 extend inwardly, as opposed to being outwardly extending, as illustrated in FIG. 2. Outer plates 54 are placed in contact with inner plates 52 in an area adjacent to combustion seal 48, unlike the point of contact shown in FIG. 2. Partial beads 68 are similar to partial beads 45, illustrated in FIG. 2, but extend outwardly and away from combustion seal 48 rather than towards it.

In each embodiment, a coating may be selectively applied to at least one entire side of a plate. The plates and layers are then oriented so that a coating is exposed where wanted. This greatly reduces manufacturing costs since the coatings do not have to be selectively applied to a part of a plate, with portions of the plate masked off.

Preferred embodiments have been disclosed. A worker of ordinary skill in the art would realize, however, that certain modifications would come within the teaching of this invention. For example, it may be desirable to have more plates at a particular location. Additional functional layers reduce the amount of deflection per layer, thereby reducing fatigue cracks. Likewise, it may be preferred for a particular application to have fewer plates, but with a single plate formed such that it contains two types of coating, thus representing more than one layer of a portion of gasket 20. Having fewer layers results in additional cost savings. The following claims should be studied in order to determine the true scope and content of the invention.

We claim:

1. A cylinder head gasket of an internal combustion engine comprising:

a plurality of metal plates forming layers of said gasket;

first and second sets of openings selectively formed within said plates;

a first high temperature coating on a side of a first of said plates for sealing around said first set of openings to securely seal same when said gasket is tightened;

a second elastomeric coating on a side of a second of a said plates for sealing around said second set of openings to securely seal same when said gasket is tightened, said second plate being configured such that it is spaced from said first set of openings;

the outer surface of said first coating adapted to come into facial contact with an engine when said gasket is tightened;

the outer surface of said second coating adapted to come into facial contact with an engine when said gasket is tightened; and a shim selectively disposed between two of said first plates and surrounding said first set of said openings.

2. A cylinder head gasket as recited in claim 1, wherein said first and second plates and said shim are generally planar and parallel, and a bead is formed in said first of said plates, said bead overlying said shim in a plane parallel to said first and second plates, said second plates being spaced from said bead in said plane.

3. A cylinder head gasket of an internal combustion engine and having at least one cylinder bore and at least one fluid hole, comprising:

two metal base plates, each having at least one exterior side coated by a lubricous, high temperature coating on a majority of its surface area;

two metal outer plates, each having at least an exterior side coated by an elastomeric coating on the majority of its surface area, each of said outer plates being adjacent an exterior side of one of side base plates;

said base plates including at least one full bead adjacent to said cylinder bore such that load is applied to each full bead when said gasket is tightened;

said base plates and said outer plates including a base bead adjacent to said fluid hole such that load is applied to said base bead when said gasket is tightened; and a shim disposed between interior sides of said base plates and adjacent to said cylinder bore.

4. A cylinder head gasket as recited in claim 3, wherein said lubricous, high temperature coating is polytetrafluoroethylene.

5. A cylinder head gasket as recited in claim 4, wherein said elastomeric coating is rubber.

6. A cylinder head gasket as recited in claim 3, wherein said base plates and said outer plates are formed from stainless steel.

7. A cylinder head gasket of an internal combustion engine adapted to seal mating surfaces of an engine block and a cylinder head with combustion gas openings and fluid openings, comprising:

a pair of base plates having first and second sets of openings, and an outer lubricous, high temperature first coating on one side of each said base plate, said first coating surrounding said first set of openings, and adapted to provide a combustion seal at the combustion gas openings to insure an effective combustion seal; and a pair of outer plates, each of said outer plates being adjacent a side of one of said base plates, an outer elastomeric second coating on one side of each said outer plate, said second coating surrounding said second set of openings and adapted to be located at the fluid openings to insure an effective fluid seal, said outer plates being spaced from said first set of openings;

said first and second coatings being applied to the majority of their respective sides of said base plates and said outer plates; and a shim selectively disposed between said base plates and surrounding said first set of openings.

8. A cylinder head gasket as recited in claim 7, wherein said lubricous, high temperature coating is polytetrafluoroethylene.

9. A cylinder head gasket as recited in claim 7, wherein said elastomeric coating is rubber.

10. A cylinder head gasket as recited in claim 7, wherein said base plates and said outer plates and said shim are generally planar and parallel, and a bead is integral with each said base plate, said bead representing a planar displacement in each said base plate, said bead overlying said shim in a plane parallel to said shim, said outer plates being spaced from said bead in said plane.

11. A cylinder head gasket as recited in claim 7, wherein each side of said base plates includes said first coating.

12. A cylinder head gasket as recited in claim 7, wherein each side of said outer plates includes said second coating.

* * * * *